Figure 12:
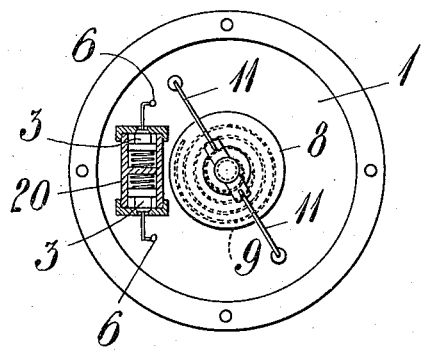

F. J. H. RUSTIGE.
INTERMITTENTLY OPERATED GAS VALVE.
APPLICATION FILED JAN. 17, 1914.
1,157,422.
Patented Oct. 19, 1915.
3 SHEETS—SHEET 1.
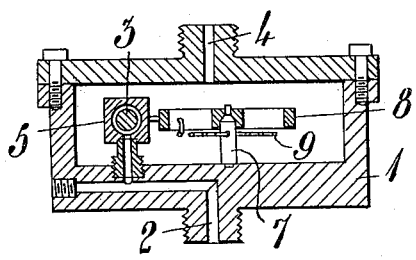
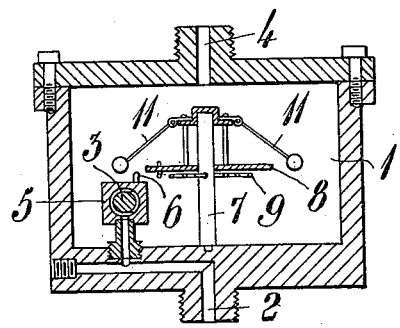
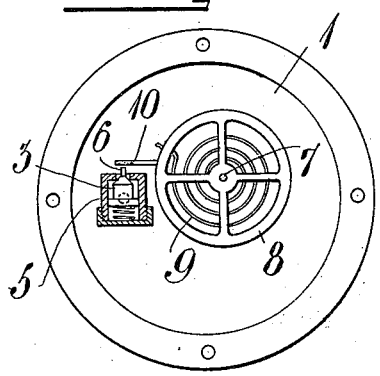
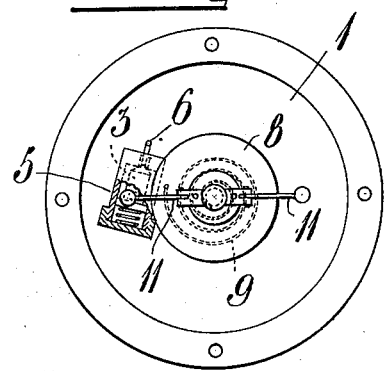
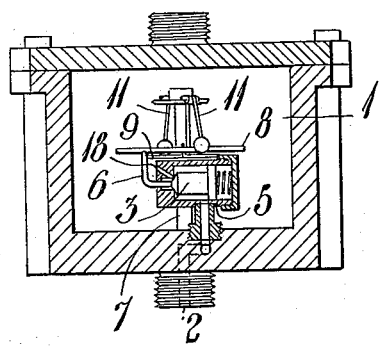

F. J. H. RUSTIGE.
INTERMITTENTLY OPERATED GAS VALVE.
APPLICATION FILED JAN. 17, 1914.
1,157,422.
Patented Oct. 19, 1915.
3 SHEETS—SHEET 2.
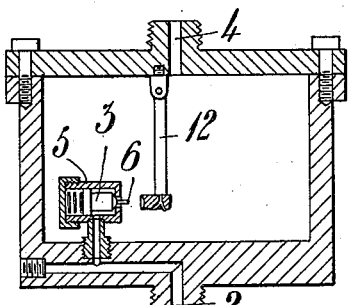
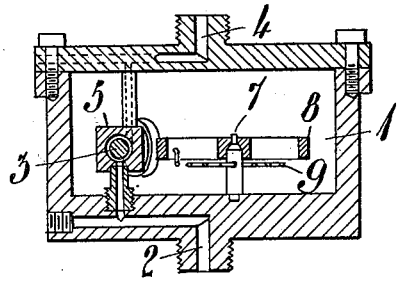
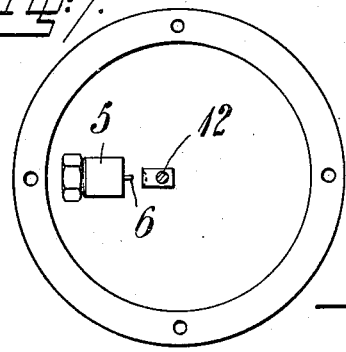
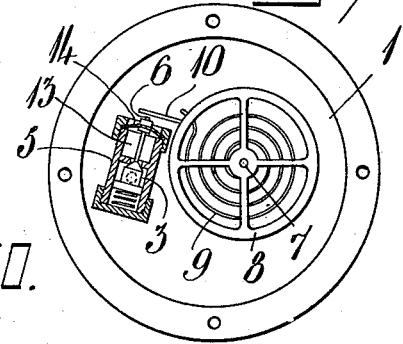
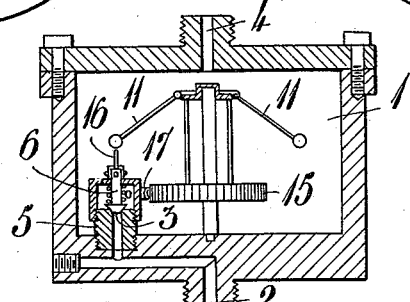
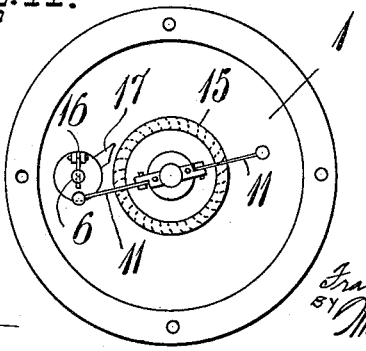

F. J. H. RUSTIGE.
INTERMITTENTLY OPERATED GAS VALVE.
APPLICATION FILED JAN. 17, 1914.

1,157,422.

Patented Oct. 19, 1915.
3 SHEETS—SHEET 3.

UNITED STATES PATENT OFFICE.

FRANS JOHAN HENRIK RUSTIGE, OF STOCKHOLM, SWEDEN, ASSIGNOR TO AKTIE-BOLAGET LUX, A COMPANY LD, OF STOCKHOLM, SWEDEN.

INTERMITTENTLY-OPERATED GAS-VALVE.

1,157,422.   Specification of Letters Patent.   Patented Oct. 19, 1915.

Application filed January 17, 1914. Serial No. 812,848.

*To all whom it may concern:*

Be it known that I, FRANS JOHAN HENRIK RUSTIGE, a subject of the King of Sweden, residing at Lilla Essingen, Stockholm, Sweden, have invented new and useful Improvements in Intermittently - Operated Gas-Valves, of which the following is a specification.

The present invention relates to means for repeatedly interrupting a gas current and is particularly adapted for producing intermittent light in signaling devices, said means being capable of effecting a very uniform periodicity in its action. This property is due to the fact that the member controlling the interruption consists of a member oscillating like a pendulum and being kept in motion by the proper action of the escaping gas. For instance the member may consist of a spring actuated balance oscillating around an axis or of a common form of pendulum, or finally it may always rotate in the same direction but in the same time be made according to the principle of a fly ball governor so that some part thereof at the rise of speed, caused by the escaping gas, changes its position under the influence of the centrifugal force and returns when the speed again decreases.

In the accompanying drawing, Figure 1 shows one form of the invention in a vertical section and Fig. 2 a corresponding plan view with the cover of the casing removed; Fig. 3 a second form of the invention in a vertical section; Fig. 4 a corresponding plan view with the cover of the casing removed; Fig. 5 a vertical section of this apparatus substantially perpendicular to that of Fig. 3. Fig. 6 shows a third form of the invention in a vertical section and Fig. 7 a corresponding plan view with cover removed; Fig. 8 a fourth form in a vertical section and Fig. 9 a corresponding plan view with cover removed; Fig. 10 a fifth form in a vertical section and Fig. 11 a corresponding plan view with cover removed. Fig. 12 finally, in a plan view, shows a form of the invention analogous to that shown in Figs. 3–5, but having a two-sided valve.

In the form shown in Figs. 1 and 2 the apparatus is inclosed in a casing 1, the inlet 2 of which is controlled by the valve 3, while the outlet 4 is free. The valve 3 is arranged in a bushing 5 so as to open inwardly and is provided with a pin 6 projecting outside said bushing. Around a spindle 7 journaled centrally in the casing 1 a balance 8 is capable of oscillating under the action of a spiral spring 9. This balance has a projection 10 which lies in the path of the pin 6 so as to strike the latter and open the valve. When this is done, a quantity of gas flows out into the casing 1 and impinges against the projection 10 and thus rotates the balance against the action of the spring. Then the gas escapes through the outlet 4 where it is ignited for instance by a pilot flame for effecting a flash of light. The balance swings as far as permitted by the tension of the spring and then returns, whereupon the same operations are repeated. In this manner a very exact and also easily controllable periodicity of the flash light can be obtained, while at the same time the periods of light may be made very short which is of importance for saving gas. For increasing the effect of the outrushing gas current on the projection 10 the latter may be made dish shaped, as shown.

In the form shown in Figs. 3–5 the oscillatory member also consists of a balance 8 movable around a spindle 7, but instead of a fixed projection 10 this balance here carries two weighted arms 11 which are swung out more or less under the influence of the centrifugal force. This enables the balance to be swung more than one revolution at a time, as at a sufficient speed of said balance the arms 11 are lifted above the valve bushing 5 so as to pass the same freely. Only when the speed has decreased to a certain extent by the action of the spring, one of the arms 11 hits the pin 6 which is here bent upward, so that a quantity of gas can escape. On account of the oblique direction of the outlet port 18 (see Fig. 5) this gas is directed obliquely upward so as to strike the weight of the corresponding arm 11 and swing the arms again. Otherwise this form is like that already described. This arrangement may also be modified in the manner illustrated in a plan view by Fig. 12. The valve casing 20 here has two chambers in which two valves 3 are movable so as to open in opposite directions. Each valve is provided with an upwardly bent pin 6 as the single valve in Figs. 3-5, and thus one valve or the other is opened depending upon the side from which the parts are struck by the arms 11 which are similar to those shown in Figs. 3-5. Other parts are also the same as in these figures.

In Figs. 6 and 7, there is used, instead of a balance, a swinging pendulum 12, a construction which—as also that shown in Figs. 3 and 4—of course only may be used when the apparatus assumes a certain fixed position, viz. that shown in the drawing. The valve proper should be similar to the forms described before, and its pin should of course be in the swinging plane of the pendulum.

Figs. 8 and 9 show a construction which differs from that shown in Figs. 1 and 2 substantially in that the escaping gas does not directly actuate the projection 10 of the balance, but fills a space 13 limited by a diaphragm 14 to which the pin 6 of the valve is secured, so that the said pin at the expansion of the diaphragm pushes forth the balance substantially simultaneously with the closing of the valve. From the space 13, the gas flows directly to the outlet 4; thus it never fills the chamber in which the balance swings whence said chamber may well be in communication with the open air.

Finally in Figs. 10 and 11, the gas or fluid emanating from the valve 3 actuates a small turbine wheel 15 secured to a rotatable spindle 19. On the same spindle there are fixed two swinging weighted arms 11 which in a sufficiently low position strike one end of a small bell crank lever 16 the other arm of which normally holds the pin 6 with the valve 3 down. Hereby the valve is opened for a moment, and the fluid then escaping through the nozzle 17 increases the speed of the turbine wheel so that the arms 11 will be lifted above the lever 16 for another period of time. Also in this way the opening of the valve may thus be effected at fixed intervals.

Having now particularly described the nature of my invention and the manner of its operation, what I claim is:

1. In intermittently operated gas valves, a member capable of swinging freely according to the laws of a pendulum, an impact member operatively connected to the said swinging member, a valve member having a projection lying in the path of said swinging member, and a discharge channel from said valve member directed toward said impact member.

2. In intermittently operated gas valves, a casing, a shaft journaled therein, a balance having a projection mounted on said shaft, a spring tending to rotate said balance in one direction, an inner casing provided within the first mentioned casing, a valve member mounted within said inner casing, said valve member having a projection lying in the path of the projection of the balance.

3. In intermittently operated gas valves, a member mounted to swing freely according to the laws of a pendulum, a valve casing having a discharge channel, a valve member controlling said channel, means associated with the swinging member for intermittently operating the valve member, and means actuated by the flow of gas through said channel each time the valve is opened for imparting a motive impulse to the swinging member.

4. In intermittently operated gas valves, a member mounted to swing freely according to the laws of a pendulum, a valve casing having a discharge channel, a valve member controlling said channel, means associated with the swinging member for operating the valve member whenever the stroke of the swinging member falls below normal, and means actuated by the flow of gas through said channel each time the valve is opened for imparting a motive impulse to the swinging member.

5. In intermittently operated gas valves, a member mounted to swing freely according to the laws of a pendulum, a valve casing having a discharge channel, a valve member controlling said channel and having an actuating projection disposed in the path of the swinging member to be struck thereby to intermittently operate the valve member, and means actuated by the flow of gas through said channel each time the valve is opened for imparting a motive impulse to the swinging member.

6. In intermittently operated gas valves, a member mounted to swing freely according to the laws of a pendulum, a valve casing having a discharge channel, an impact member operatively connected to the said swinging member and adapted to move into alinement with the said discharge channel intermittently, and a valve member within said casing normally closing said channel and having a projection lying in the path of the swinging member.

7. In intermittently operated gas valves, a shaft mounted for oscillation, a balance mounted on said shaft, a spring tending to rotate the balance in one direction, an oscillatory member carried by the balance and adapted to be influenced by centrifugal force during movement of the balance, a valve casing having a discharge channel, a valve member within said casing normally closing the channel and having a projection adapted to be engaged by the said oscillatory member when the motion of the balance falls below normal to open the valve, and means actuated by the flow of gas through said channel each time the valve is opened for imparting a motive impulse to the balance.

In testimony whereof I have signed my name to this specification in the presence of two subscribing witnesses.

FRANS JOHAN HENRIK RUSTIGE.

Witnesses:
BERGER NORDFELDT,
A. SIMON.

Copies of this patent may be obtained for five cents each, by addressing the "Commissioner of Patents. Washington, D. C."